United States Patent
Lin et al.

(10) Patent No.: US 7,685,363 B2
(45) Date of Patent: *Mar. 23, 2010

(54) LOW PROFILE STORAGE DEVICE

(75) Inventors: Kun-Cheng Lin, Chung Ho (TW);
Wen-Lung Lin, Chung Ho (TW);
Yi-Ling Liu, Chung Ho (TW);
Chang-Cheng Tsai, Chung Ho (TW)

(73) Assignee: Power Quotient International Co., Ltd., Taipei (TW)

( * ) Notice: Subject to any disclaimer, the term of this patent is extended or adjusted under 35 U.S.C. 154(b) by 430 days.

This patent is subject to a terminal disclaimer.

(21) Appl. No.: 11/639,288

(22) Filed: Dec. 15, 2006

(65) Prior Publication Data

US 2007/0143543 A1    Jun. 21, 2007

(30) Foreign Application Priority Data

Dec. 20, 2005    (TW) ............................... 94145201 A

(51) Int. Cl.
*G06F 12/00* (2006.01)
*G06F 13/00* (2006.01)
*G06F 13/28* (2006.01)

(52) U.S. Cl. ..................................... 711/115
(58) Field of Classification Search .................. 711/115
See application file for complete search history.

(56) References Cited

U.S. PATENT DOCUMENTS

| | | | | |
|---|---|---|---|---|
| 5,537,343 A | * | 7/1996 | Kikinis et al. | 361/679.56 |
| 6,068,193 A | * | 5/2000 | Kreft | 235/492 |
| 6,567,273 B1 | * | 5/2003 | Liu et al. | 361/737 |
| 6,883,718 B1 | * | 4/2005 | Le et al. | 235/492 |
| 6,993,618 B2 | * | 1/2006 | Chen et al. | 710/305 |
| 7,213,766 B2 | * | 5/2007 | Ryan et al. | 235/492 |
| 7,364,090 B2 | * | 4/2008 | Cuellar et al. | 235/492 |
| 7,381,076 B2 | * | 6/2008 | Bychkov et al. | 439/344 |
| 7,391,607 B2 | * | 6/2008 | Minami | 361/679.33 |
| 7,427,217 B2 | * | 9/2008 | Chou et al. | 439/660 |
| 7,507,119 B2 | * | 3/2009 | Ni et al. | 439/607.01 |
| 2004/0139279 A1 | * | 7/2004 | Hoogerdijk | 711/115 |
| 2004/0255064 A1 | * | 12/2004 | Chen et al. | 710/62 |
| 2006/0053238 A1 | * | 3/2006 | Hung et al. | 710/62 |
| 2006/0066641 A1 | * | 3/2006 | Gally et al. | 345/690 |
| 2006/0154525 A1 | * | 7/2006 | Bychkov et al. | 439/607 |
| 2006/0219776 A1 | * | 10/2006 | Finn | 235/380 |
| 2007/0143544 A1 | * | 6/2007 | Lin et al. | 711/115 |

* cited by examiner

*Primary Examiner*—Sheng-Jen Tsai
(74) *Attorney, Agent, or Firm*—Ming Chow; Sinorica, LLC

(57) ABSTRACT

A low profile storage device is disclosed to include a first interface having a plurality of contact terminals movably exposed to the outside for connection to a computer, an interface controller coupled to the first interface to execute signal conversion and protocol operation of the first interface, a memory for storing data temporarily, a memory controller respectively coupled to the interface controller and the memory to transfer data from the memory to the computer and to receive data from the computer and store the data in the memory.

11 Claims, 10 Drawing Sheets

LOW PROFILE STORAGE DEVICE

BACKGROUND OF THE INVENTION

1. Field of the Invention

The present invention relates to storage devices and more particularly, to a low profile storage device, which has the shape and thickness of a credit card.

2. Description of the Related Art

Regular storage devices for commercial flash memory cards commonly provide only one insertion slot for a specific memory card. However, due to the effect of the thickness of the interface connector or the connection of the cable between the interface connector and the storage device, the conventional storage devices are inconvenient to carry by the user and do not have a thinnerization characteristic.

The Netherlands Patent No. NL1022277C (filed on Dec. 30, 2002, published on Jul. 1, 2004) discloses a memory device that comprises a housing, a printed circuit board, a USB controller, a memory chip, a USB connector, and a cable. This patent is adapted to provide a flat type storage device. However, this patent has a certain thickness because of the use of a regular USB connector. Further, this patent uses a cable to connect the USB connector to the USB controller. The use of the cable results in carrying inconvenience.

Therefore, it is desirable to provide a low profile storage device that has a shape and size approximately equal to a credit card.

SUMMARY OF THE INVENTION

The present invention has been accomplished under the circumstances in view. It is the main object of the present invention to provide a low profile storage device, which uses a low thickness interface connector to lower the thickness of the low profile storage device.

It is another object of the present invention to provide a low profile storage device, which has a low thickness interface connector directly coupled to the interface controller thereof by a circuit line without through a cable so that the low profile storage device is convenient for carriage by the user.

It is still another object of the present invention to provide a low profile storage device, which has a second interface connector connectable to a mobile electronic apparatus so that the low profile storage device can be used as a memory card.

It is still another object of the present invention to provide a low profile storage device, which has an insertion slot for receiving a memory card so that the low profile storage device can be used as a card reader.

To achieve these and other objects of the present invention, the low profile storage device comprises a first interface, the first interface having a plurality of contact terminals movably extending out of the housing for connection to a computer; an interface controller coupled to the first interface and adapted to execute signal conversion and protocol operation of the first interface; a memory for storing data temporarily; a memory controller respectively coupled to the interface controller and the memory and adapted to transfer data from the memory to the computer to which the first interface is connected and to receive data from the computer to which the first interface is connected and then store the data in the memory.

Further, the first interface is an I-Stick interface compatible to a USB interface.

The low profile storage device further comprises a printed circuit board carrying the interface controller, the memory and the memory controller. The printed circuit board has circuit line means coupled to the first interface.

Further, the printed circuit board is a flexible printed circuit board.

The low profile storage device further comprises a card reader controller coupled to the interface controller, and an insertion slot coupled to the card reader controller for receiving a memory card.

The insertion slot is adapted to receive one of memory cards including contact type memory card, SIM card, CF memory card, SD memory card.

The low profile storage further comprises a second interface connectable to an external mobile electronic product, and a second interface controller. The second interface is coupled to the second interface controller.

The external mobile electronic product can be PDA, digital camera, or mobile video player.

Further, the second interface can be a SmartMedia, CompactFlash, MMC, Security Digital (SD), Memory Stick, Memory Stick Pro, xD or Microdrive, Memory Stick Duo or Memory Stick Pro Duo memory card interface and the second interface controller is adapted to control the second interface.

The low profile storage device further comprises a display device and a drive circuit. The display device is coupled to the memory controller for displaying information. The drive circuit is coupled to the display device.

The display device can be a STN-LCD (Super Twisted Nematic LCD), TFT LCD (Thin Film Transistor LCD), or OLED (Organic Light Emitting Display).

The low profile storage device further comprises a receiver coupled to the card reader controller to receive external information wirelessly.

The receiver can be a bluetooth module or wireless network module.

The low profile storage device further comprises a solar charger coupled to the interface controller, the memory and the memory controller, and adapted to receive the radiation energy of the sun and to convert the radiation energy of the sun into electric energy for use by the interface controller, the memory and the memory controller.

The solar charger comprises a solar panel and a storage battery. The solar panel receives the radiation energy of the sun, and converts the radiation energy of the sun into electric energy. The storage battery is adapted to store electric energy from the solar panel.

The low profile storage device further comprises a magnetic strip for recording usage track of the low profile storage device.

The low profile storage device further comprises a RFID receiver mounted on the printed circuit board to induce a RFID code from a RFID transmitter such that when the induced RFID code is matched, the RFID receiver does not encrypt the data in said memory and, when the induced RFID code is not matched, the RFID receiver encrypts the data in said memory.

The low profile storage device further comprises a hardware security device mounted on the printed circuit board for inducing a code inputted by the user such that when the code inputted by the user is matched, the hardwire security device does not encrypt the data in the memory and, when the code inputted by the user is not matched, the hardware security device encrypts the data in the memory.

Further, the hardware security device is a fingerprint recognition system for inducing the user's fingerprint.

Further, the low profile storage device has a card-like outer appearance. The card-like outer appearance has a size equal to a credit card.

The low profile storage device further comprises a housing that houses and protects the first interface, the interface controller, the insertion slot, and the card reader controller.

Further, the housing can be made in integrity. Alternatively, the housing can be formed of a top cover shell and a bottom cover shell.

DETAILED DESCRIPTION OF THE PREFERRED EMBODIMENT

Figure 1:
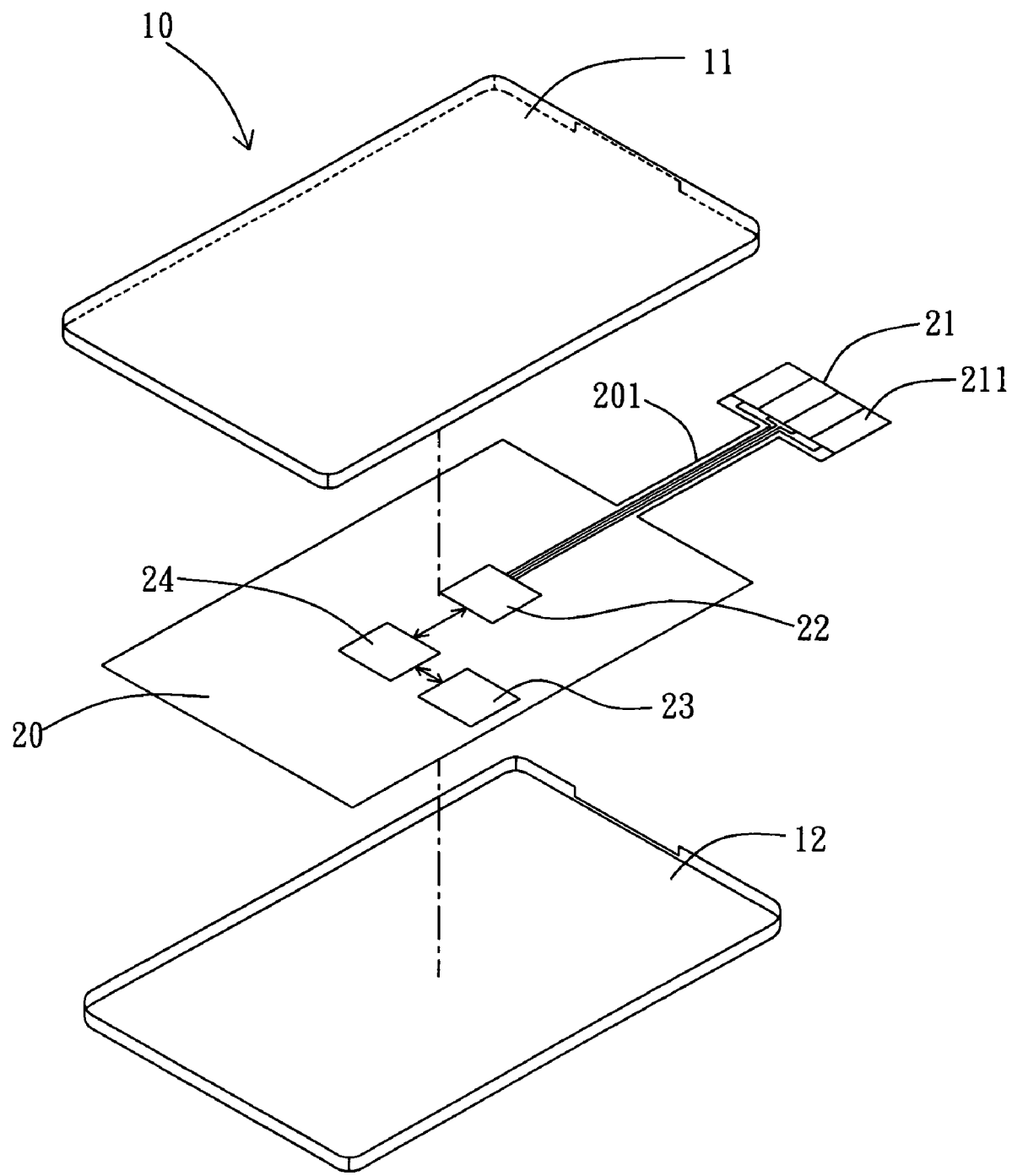
FIG. 1 is a schematic exploded view of a low profile storage device according to the present invention.
Figure 2:
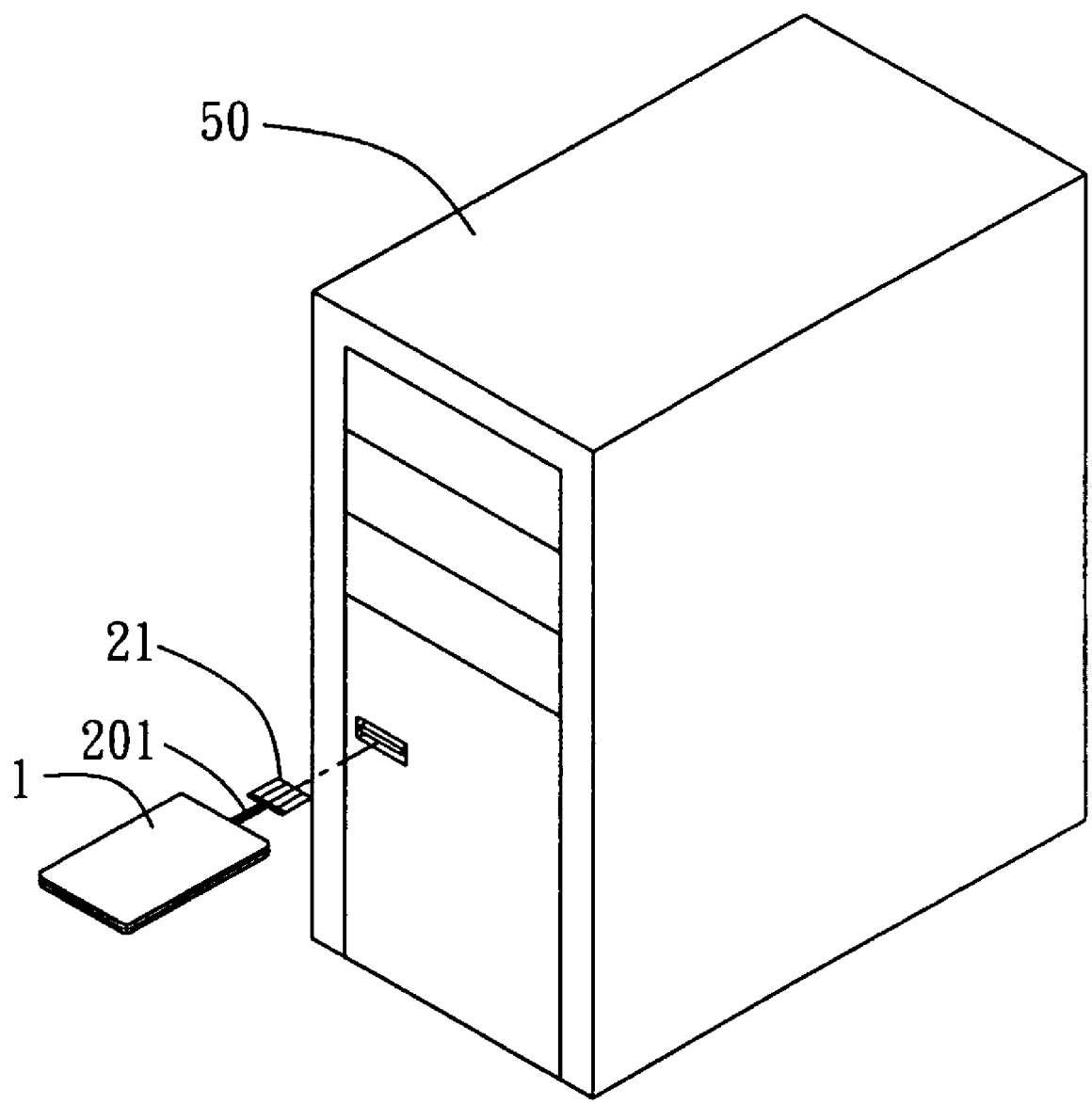
FIG. 2 illustrates the low profile storage device assembled for use in a computer.

Referring to FIGS. 1~4, a low profile storage device 1 in accordance with the present invention is shown comprised of a housing 10, a printed circuit board 20, a first interface 21, an interface controller 22, a memory 23, a memory controller 24, an insertion slot 25, a card reader controller 26, and a second interface 27.

The housing 10 is comprised of a flat top cover shell 11 and a flat bottom cover shell 12, holding the first interface 21, the interface controller 22, the memory 23 and the memory controller 24 on the inside. Alternatively, the housing 10 can be made in integrity. The housing 10 has a flat outer appearance shaped like a flat card approximately equal to the standard size of a credit card.

The printed circuit board 20 is adapted to carry the interface controller 22, the memory 23 and the memory controller 24, having a circuit line 201 coupled to the first interface 21. The printed circuit board 20 can be a flex circuit board that minimizes the thickness of the storage device 1. The circuit line 201 is movable. Further, the circuit line 201 can be directly formed on the printed circuit board 20.

The first interface 21 is an I-Stick interface, having a low profile and compatible to a regular USB interface. The first interface 21 has a plurality of contact terminals 211 movably extended from one side of the printed circuit board 20 for coupling to one USB port of the computer 50.

The interface controller 22 is a USB interface controller. By means of the wiring of lead wires (not shown) on the printed circuit board 20 and coupling of the circuit line 201 to the first interface 21, the interface controller 22 executes signal conversion and protocol operation of the first interface 21. Therefore, the invention uses a low thickness and non-standard interface that is useable in the interface of a USB connector, for example, an I-Stick interface from Power Quotient International, Taiwan. The use of an I-Stick interface can reduce the thickness of the interface connector. Further, by means of the wiring of lead wires on the printed circuit board 20 and the coupling of the circuit line 201 to the first interface 21, the invention eliminates the use of a cable so that the low profile storage device 1 is convenient to carry by the user.

The second interface 27 has a plurality of contact terminals 271 extending out of the low profile storage device 1 for coupling to the computer 50. The second interface 27 can be a SmartMedia, CompactFlash, MMC, Security Digital (SD), Memory Stick, Memory Stick Pro, xD or Microdrive, Memory Stick Duo or Memory Stick Pro Duo memory card interface.

Referring to FIG. 2 again, during the assembly process of the low profile storage device 1, the circuit line 201 is arranged on the printed circuit board 20 properly, and then the first interface 21, the interface controller 22, the memory 23 and the memory controller 24 are arranged on the printed circuit board 20, and then the printed circuit board 2 with the interface controller 22, the memory 23 and the memory controller 24 are housed inside the housing 10, allowing the first interface 21 to be suspending outside the housing 20. After the low profile storage device 1 is assembled, the first interface 21 is inserted into one USB port of the computer 50 so that the computer 50 can fetch data from the memory 23 or store data in the memory 23. As stated above, the invention uses an I-Stick interface for the first interface 10 to reduce the thickness of the interface connector. By means of the layout of lead wires on the printed circuit board 20 and coupling of the circuit line 201 to the first interface 21 to substitute for a cable, the low profile storage device 1 is convenient to carry by the user.

Figure 3:
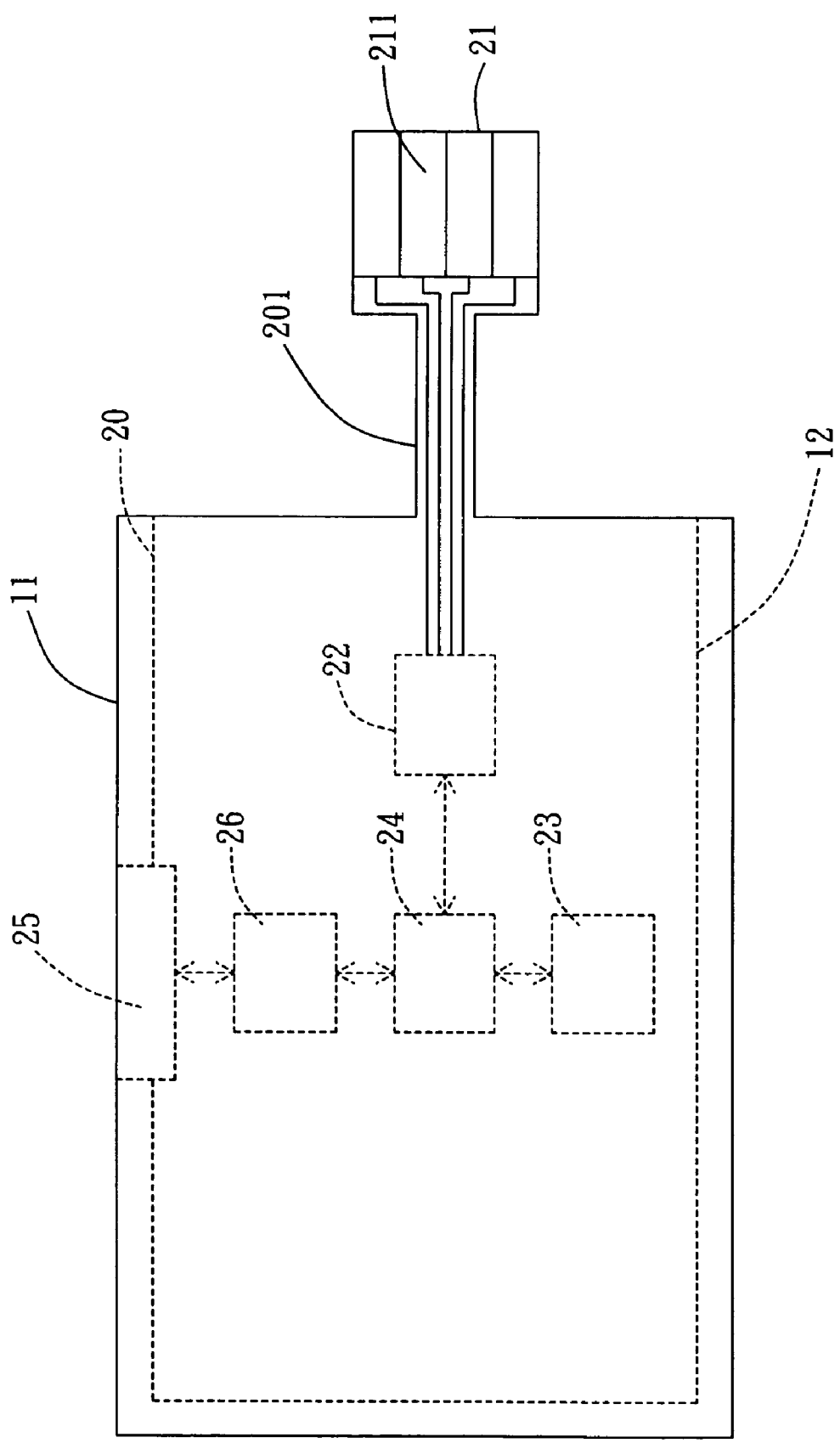
FIG. 3 is a schematic drawing of the present invention showing the low provide storage device further provided with an insertion slot and a card reader controller.
Figure 4:
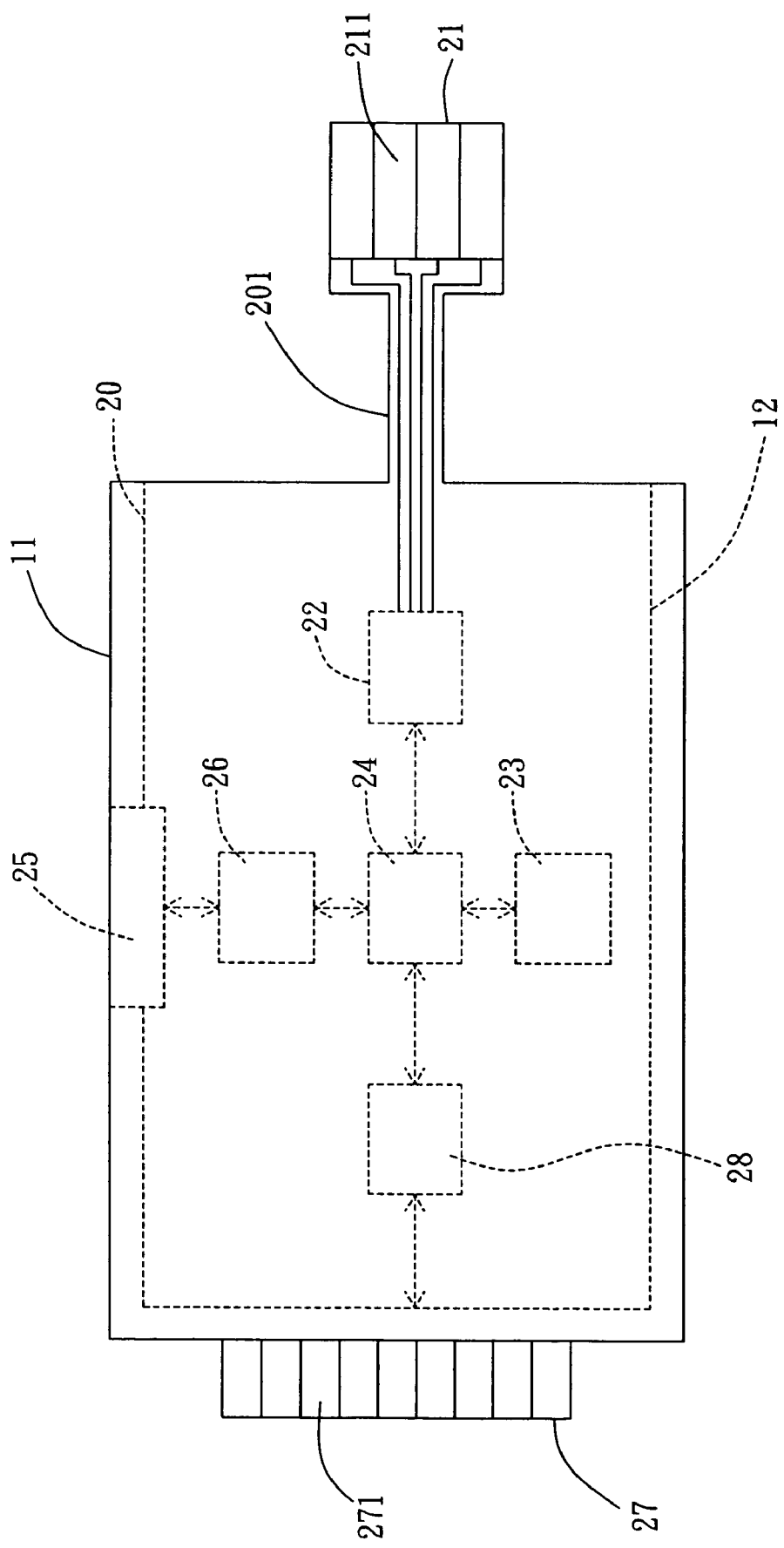
FIG. 4 is a schematic drawing of the present invention showing the low provide storage device further provided with a second interface and a second interface controller.

FIG. 3 illustrates the arrangement of the insertion slot 25 and the card reader controller 26 inside the low profile storage device 1. The insertion slot 25 is for the insertion of at least one memory card (not shown). For example, the insertion slot 25 can be constructed to receive a SmartMedia, Compact-Flash, MMC, Security Digital (SD), Memory Stick, Memory Stick Pro, xD or Microdrive, Memory Stick Duo or Memory Stick Pro Duo memory card. The card reader controller 26 is respectively coupled to the interface controller 22 and the insertion slot 25, and adapted to receive data from the inserted memory card and transfer received data to the computer 50 for processing, or to receive data from the computer 50 and store received data in the inserted memory card.

Referring to FIG. 4 again, the low profile storage device 1 further comprises a second interface controller 28. The aforesaid second interface 27 is coupled to the second interface controller 28. The second interface 27 has its contact terminals 271 extending out of the low profile storage device 1 for coupling to the computer 50. The second interface controller 28 is adapted to control the second interface 27, enabling the low profile storage device 1 to be used as a SmartMedia, CompactFlash, MMC, Security Digital (SD), Memory Stick, Memory Stick Pro, xD or Microdrive, Memory Stick Duo or Memory Stick Pro Duo memory card.

Figure 5:
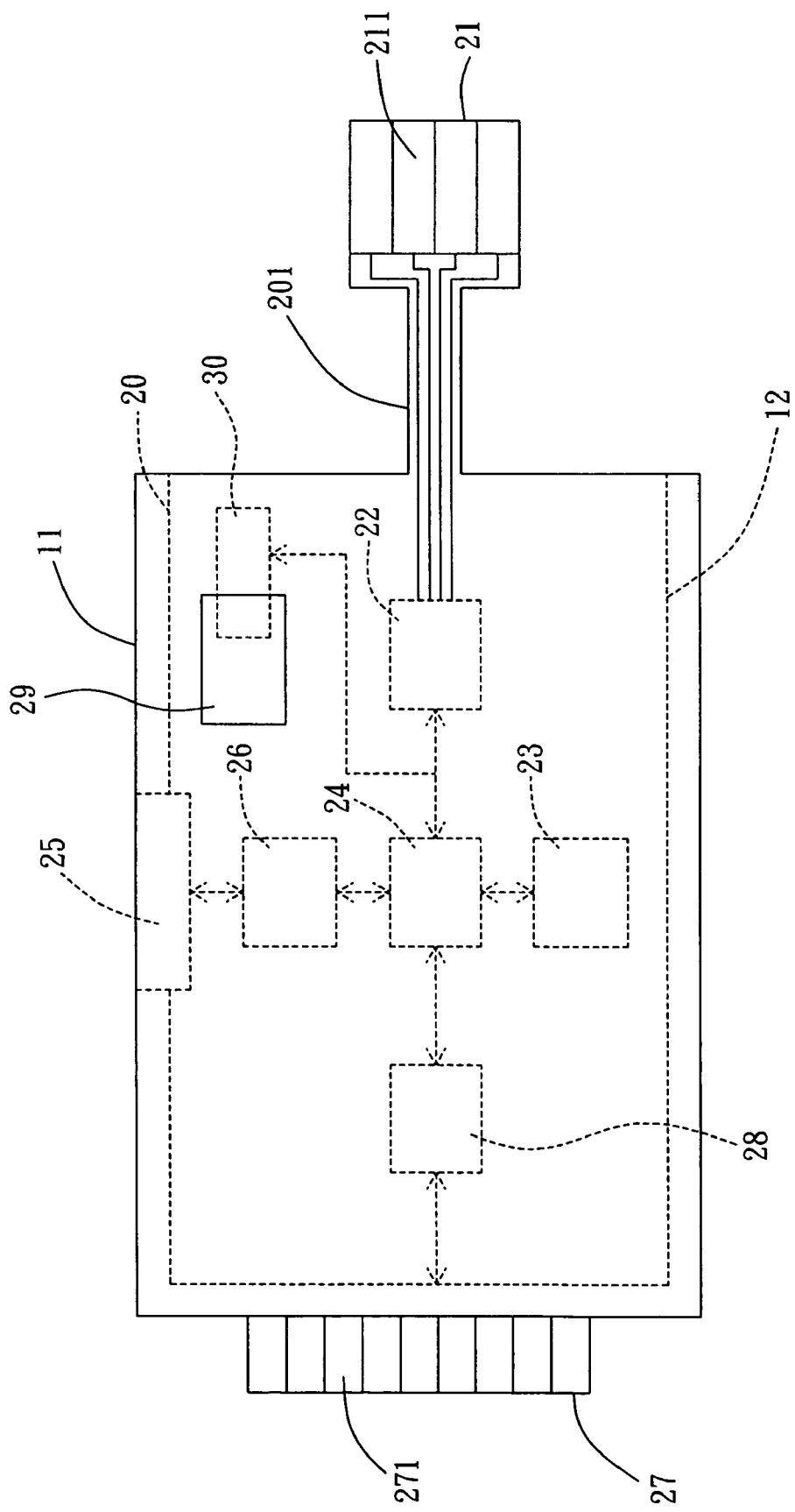
FIG. 5 is a schematic drawing of the present invention showing the low provide storage device further provided with a display device and a drive circuit.

Referring to FIG. 5, the low profile storage device 1 further comprises a display device 29 and a drive circuit 30. The display device 29 is arranged on the outside of the housing 10 for displaying related message, having a circuit line (not shown) coupled to the memory controller 24. The drive circuit 30 is coupled to the display device 29, and adapted to drive the display device 29. The display device 29 can be, for example, a STN-LCD (Super Twisted Nematic LCD), TFT LCD (Thin Film Transistor LCD), OLED (Organic Light Emitting Display).

Figure 6:
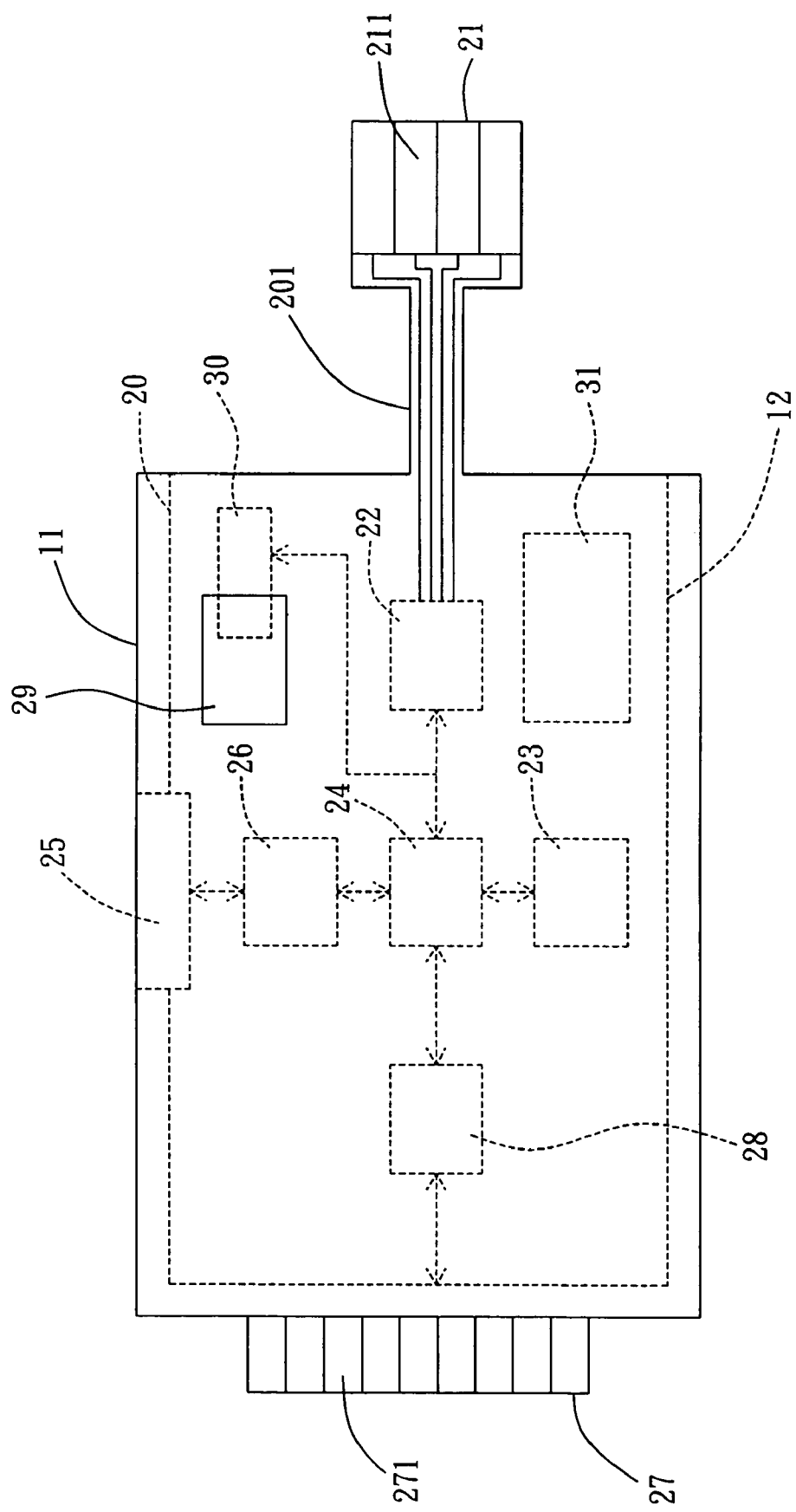
FIG. 6 is a schematic drawing of the present invention showing the low provide storage device further provided with a receiver.

Referring to FIG. 6, the low profile storage device 1 further comprises a receiver 31. The receiver 31 can be a bluetooth module or wireless network module. It is coupled to the memory controller 24 so that the low profile storage device 1 can receive external information wirelessly.

Figure 7:
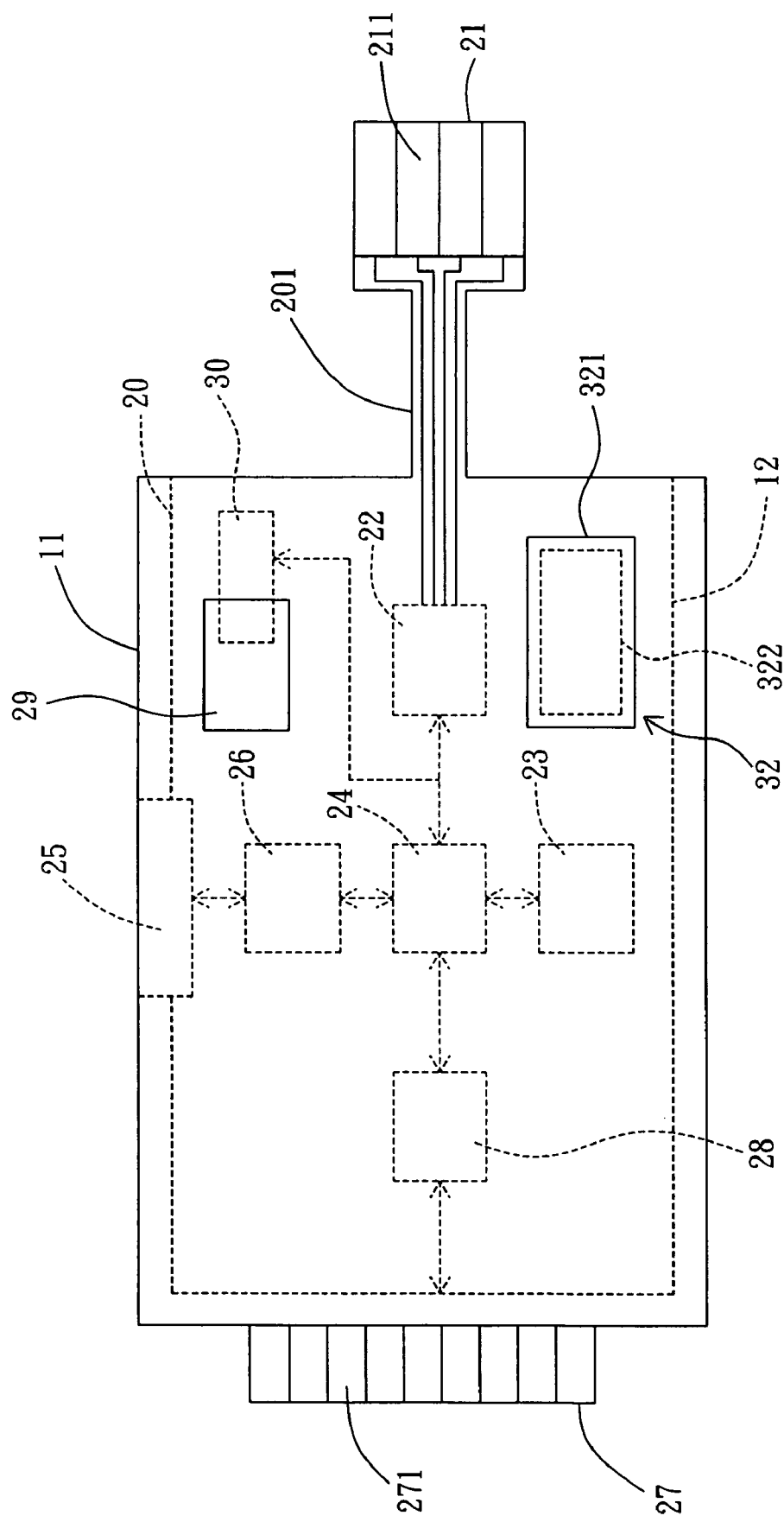
FIG. 7 is a schematic drawing of the present invention showing the low provide storage device further provided with a solar charger.

Referring to FIG. 7, the low profile storage device 1 further comprises a solar charger 32. The solar charger 32 is provided on the outside of the housing 10, having circuit lines respectively coupled to the interface controller 22, the memory 23, the memory controller 24, the insertion slot 25, the card reader controller 26, the second interface 27, the second interface controller 28, the display device 29, the drive circuit 30, and the receiver 31. The solar charger 32 receives the radiation energy of the sun and converts it into electric energy for the devices connected thereto.

The solar charger 32 comprises a solar panel 321 and a storage battery 322. The solar panel 321 is mounted on the outside of the housing 10, and adapted to receive the radiation energy of the sun and converts the received sunlight energy into electric energy for storing in the storage battery 322.

Figure 8:
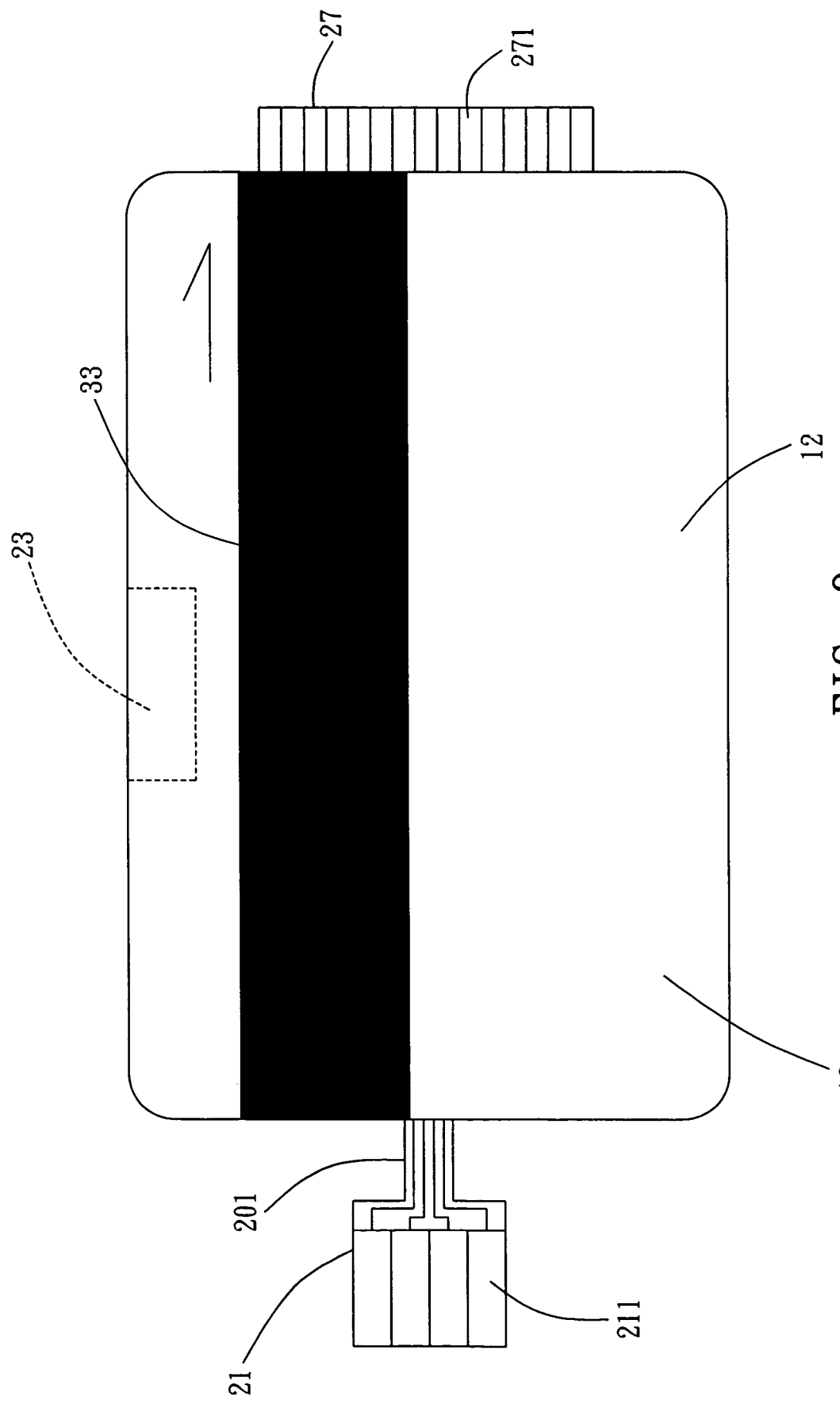
FIG. 8 is a schematic drawing of the present invention showing the low provide storage device further provided with a magnetic strip.

Referring to FIG. 8, the low profile storage device 1 further comprises a magnetic strip 33. The magnetic strip 33 is arranged on the outside of the housing 10 for recording usage track of the low profile storage device.

Figure 9:
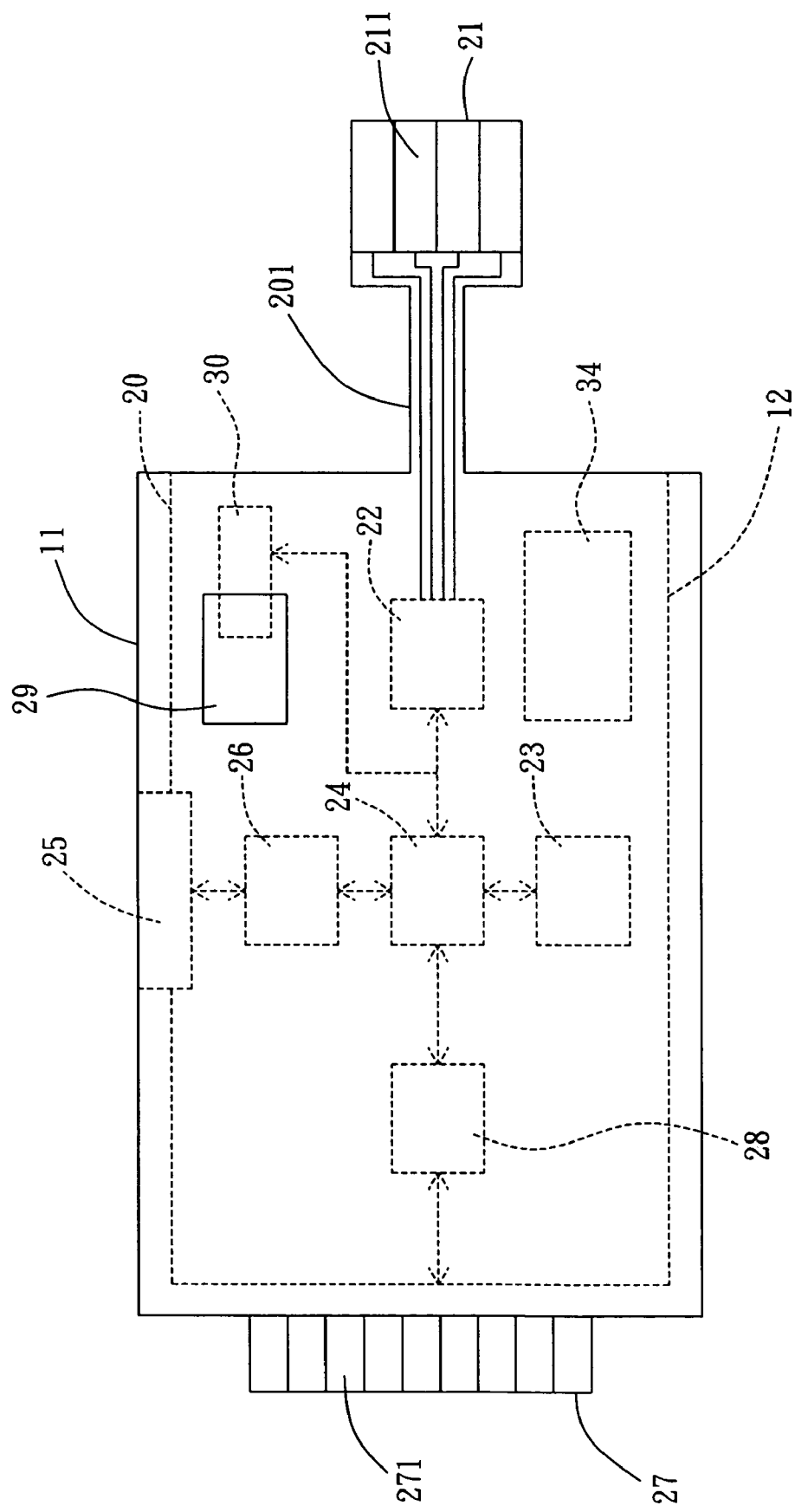
FIG. 9 is a schematic drawing of the present invention showing the low provide storage device further provided with a RFID receiver.

Referring to FIG. 9, the low profile storage device 1 further comprises a RFID (Radio Frequency Identification) receiver 34. The RFID receiver 34 is mounted on the printed circuit board 20, and adapted to receive a RFID code from a RFID transmitter (not shown). When the received RFID code is matched, the RFID receiver 34 does not encrypt the data in the memory 23. On the contrary, when the received RFID is not matched, the RFID receiver 34 encrypts the data in the memory 23.

Figure 10:
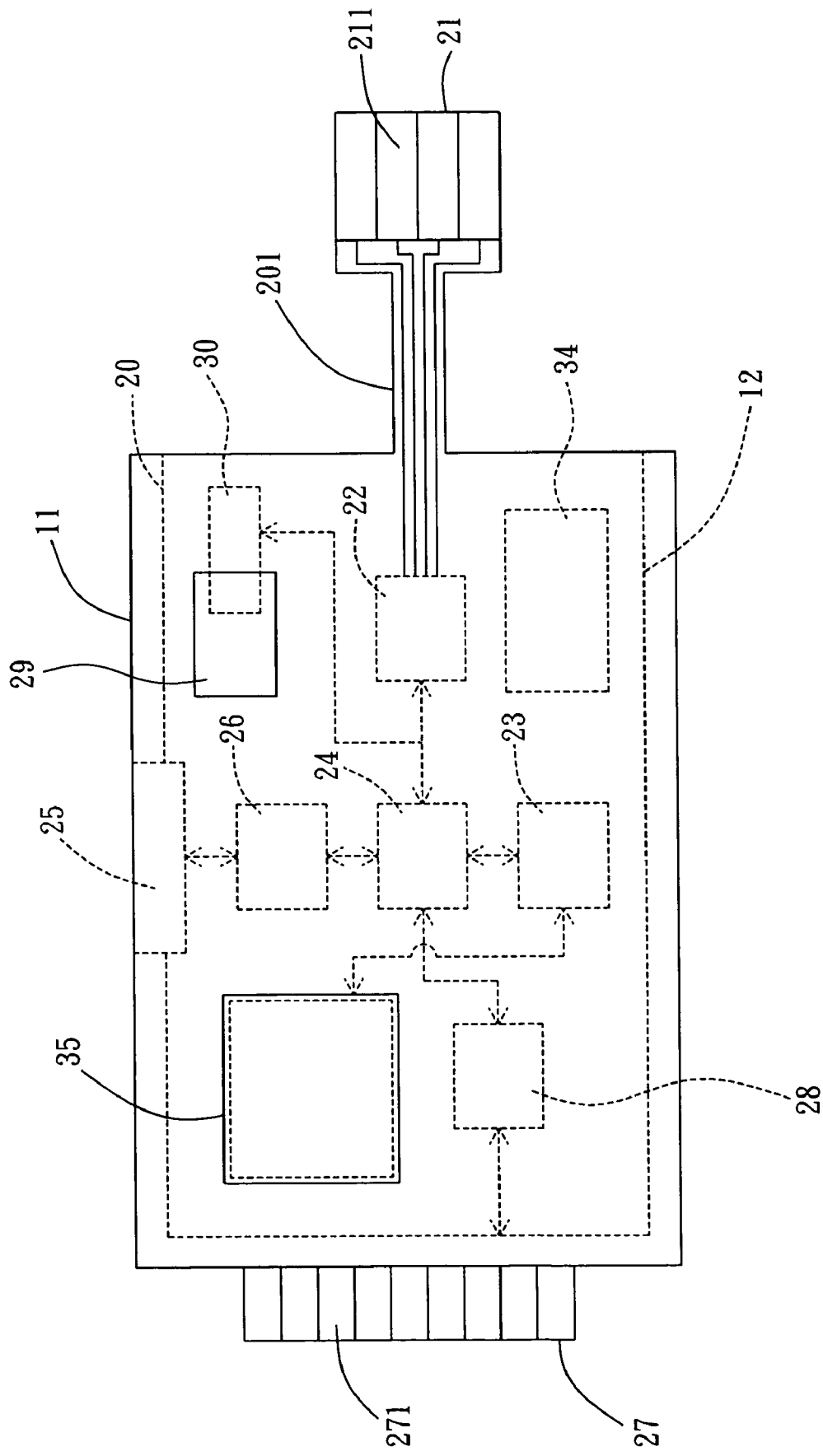
FIG. 10 is a schematic drawing of the present invention showing the low provide storage device further provided with a hardware security device.

Referring to FIG. 10, the low profile storage device 1 further comprises a hardware security device 35. The hardware security device 35 is mounted on the printed circuit board 20 and exposed to the outside of the low profile storage device 1 to induce a code inputted by the user. When the code inputted by the user is matched, the hardware security device 35 does not encrypt the data in the memory 23. On the contrary, when the code inputted by the user is not matched, the hardware security device 35 encrypts the data in the memory 23.

The hardware security device 35 is a fingerprint recognition circuit exposed to the outside of the low profile storage device 1 for inducing the user's fingerprint.

As stated above, the invention uses an I-Stick interface to reduce the thickness of the interface connector, and by means of the layout of lead wires on the printed circuit board and coupling of the circuit line to the USB interface to substitute for a cable, the low profile storage device is convenient to carry by the user and eliminates the drawbacks of the prior design.

A prototype of low profile storage device has been constructed with the features of FIGS. 1~10. The low profile storage device functions smoothly to provide all of the features as discussed before.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A low profile storage device comprising:
   a housing that houses parts of the low profile storage device;
   a first interface, said first interface having a plurality of contact terminals movably extending out of said housing for connection to a computer;
   an interface controller coupled to said first interface and adapted to execute signal conversion and protocol operation of said first interface;
   a memory for storing data temporarily;
   a memory controller respectively coupled to said interface controller and said memory and adapted to transfer data from said memory to the computer to which said first interface is connected and to receive data from the computer to which said first interface is connected and then store the data in said memory;
   said first interface is an I-Stick interface compatible to a USB interface;
   said low profile storage device further comprising a printed circuit board carrying said interface controller, said memory and said memory controller, said printed circuit board having circuit line means coupled to said first interface and said printed circuit board is a flexible printed circuit board;
   a card reader controller coupled to said interface controller, and an insertion slot coupled to said card reader controller for receiving a memory card;
   said insertion slot is adapted to receive one of memory cards including contact type memory card, SIM card, CF memory card, SD memory card; and
   a RFID receiver mounted on said printed circuit board to receive a RFID code from a RFID transmitter such that when the received RFID code is matched, the RFID receiver does not encrypt the data in said memory; when the received RFID code is not matched, the RFID receiver encrypts the data in said memory.

2. The low profile storage device as claimed in claim 1, further comprising a second interface connectable to an external electronic product, and a second interface controller, said second interface being coupled to said second interface controller, and said external electronic product is one of the products including PDA, digital camera, and mobile video player. Further, said second interface is one of SmartMedia, CompactFlash, MMC, Security Digital (SD), Memory Stick, Memory Stick Pro, xD or Microdrive, Memory Stick Duo or Memory Stick Pro Duo memory card interfaces.

3. The low profile storage device as claimed in claim 1, further comprising a display device and a drive circuit, said display device being coupled to said memory controller for displaying information, said drive circuit being coupled to said display device and said display device is one of STN-LCD (Super Twisted Nematic LCD), TFT LCD (Thin Film Transistor LCD), and OLED (Organic Light Emitting Display).

4. The low profile storage device as claimed in claim 1, further comprising a receiver coupled to said card reader controller to receive external information wirelessly and said receiver is selected from bluetooth module and wireless network module.

5. The low profile storage device as claimed in claim 1, further comprising a solar charger provided outside said housing and coupled to said interface controller, said memory and said memory controller, and adapted to receive the radiation energy of the sun and to convert the radiation energy of the sun into electric energy for use by said interface controller, said memory and said memory controller.

6. The low profile storage device as claimed in claim 5, wherein said solar charger comprises a solar panel and a storage battery, said solar panel receiving the radiation energy of the sun and converting the radiation energy of the sun into electric energy, said storage battery being adapted to store electric energy from said solar panel.

7. The low profile storage device as claimed in claim 1, further comprising a magnetic strip provided outside said housing for recording usage track of the low profile storage device.

8. The low profile storage device as claimed in claim 1, which has a card-like outer appearance and the card-like outer appearance has a size equal to a credit card.

9. The low profile storage device as claimed in claim 2, which has a card-like outer appearance and the card-like outer appearance has a size equal to a credit card.

10. The low profile storage device as claimed in claim 1, further comprising a hardware security device mounted on said printed circuit board and exposed to the outside of said housing for inducing a code inputted by the user such that when the code inputted by the user is matched, said hardwire security device does not encrypt the data in said memory; when the code inputted by the user is not matched, said hardware security device encrypts the data in said memory and said hardware security device is a fingerprint recognition system for inducing the user's fingerprint.

11. The low profile storage device as claimed in claim 1, wherein said housing is comprised of a top cover shell and a bottom cover shell, said top cover shell and said bottom cover shell being fastened together to house said first interface, said interface controller, said memory and said memory controller.

* * * * *